(12) United States Patent
Boghossian et al.

(10) Patent No.: US 12,277,594 B2
(45) Date of Patent: Apr. 15, 2025

(54) METHODS UTILIZING A LIT OCLOCK MULTI-SENSORY CANNABIS MAGAZINE

(71) Applicant: Lit o'Clock LLC, Glendale, CA (US)

(72) Inventors: Alex Boghossian, Glendale, CA (US); Eric Boghossian, Glendale, CA (US); Leonard Babayan, Tujunga, CA (US); Trevor Beach, Los Angeles, CA (US); Zarik Boghossian, Glendale, CA (US)

(73) Assignee: Lit o'Clock, LLC, Glendale, CA (US)

( * ) Notice: Subject to any disclaimer, the term of this patent is extended or adjusted under 35 U.S.C. 154(b) by 494 days.

(21) Appl. No.: 17/482,324

(22) Filed: Sep. 22, 2021

(65) Prior Publication Data

US 2022/0114653 A1    Apr. 14, 2022

Related U.S. Application Data

(60) Provisional application No. 63/082,351, filed on Sep. 23, 2020.

(51) Int. Cl.
*G06Q 30/00* (2023.01)
*G06Q 20/12* (2012.01)
*G06Q 30/0601* (2023.01)

(52) U.S. Cl.
CPC ......... *G06Q 30/0643* (2013.01); *G06Q 20/12* (2013.01); *G06Q 30/0627* (2013.01); *G06Q 30/0639* (2013.01)

(58) Field of Classification Search
CPC ............... G06Q 30/0643; G06Q 20/12; G06Q 30/0627; G06Q 30/0639; G06Q 131/365
USPC ........................................................ 705/26.1
See application file for complete search history.

(56) References Cited

U.S. PATENT DOCUMENTS

| 6,237,760 | B1* | 5/2001 | Parker | B65D 75/5838 |
| | | | | 206/273 |
| 9,875,504 | B1* | 1/2018 | Roe | H04N 7/183 |
| 9,911,105 | B1* | 3/2018 | Brown | H04L 65/1089 |
| 10,559,019 | B1* | 2/2020 | Beauvais | G06Q 30/0625 |
| 2013/0057665 | A1* | 3/2013 | Koeman | G06Q 50/02 |
| | | | | 348/61 |
| 2014/0379610 | A1* | 12/2014 | Lindeman | G06Q 30/0282 |
| | | | | 705/347 |
| 2016/0307151 | A1* | 10/2016 | Grabovski | G06Q 20/405 |

(Continued)

FOREIGN PATENT DOCUMENTS

WO     WO-2020073135 A1 *  4/2020  .........  G06F 16/9535

OTHER PUBLICATIONS

High Times, Jun. 2013. (Year: 2013).*

*Primary Examiner* — Arielle E Weiner
(74) *Attorney, Agent, or Firm* — Mark R. Kendrick

(57) ABSTRACT

A method of selecting, purchasing and receiving a *cannabis* product by a consumer includes purchasing a *cannabis*-related magazine; downloading a *cannabis*-related software application on mobile communication device; initiating operation, at the mobile communication device, of the *cannabis*-related software application; and/or scanning a QR code on a page of the *cannabis*-related magazine, utilizing a camera of the mobile communication device, the QR code related to a *cannabis* strain that the consumer has identified. The method further includes downloading digital content files associated with the *cannabis* strain to the mobile communication device; and displaying the digital content files associated with the *cannabis* strain on a monitor or screen of the mobile communication device.

14 Claims, 11 Drawing Sheets

(56) References Cited

U.S. PATENT DOCUMENTS

2019/0183175 A1\* 6/2019 Van Lancker .......... A24F 23/02
2019/0197789 A1\* 6/2019 Macauley ............. G06T 19/006

\* cited by examiner

205

210

210

205

210

215

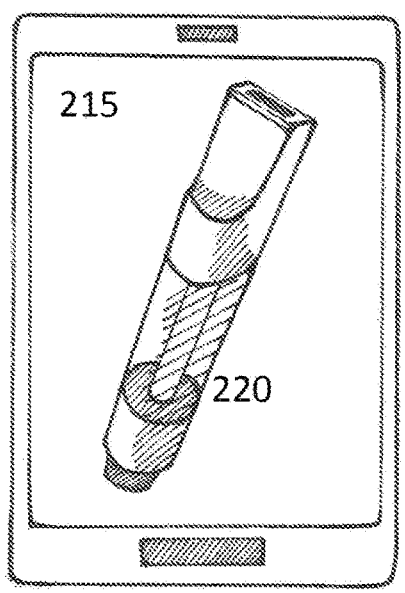
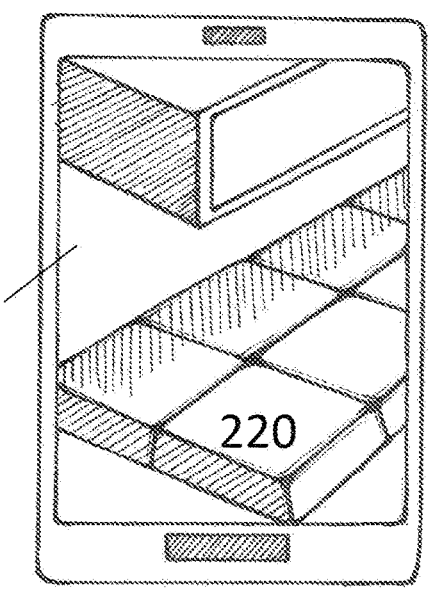
Figure 2F
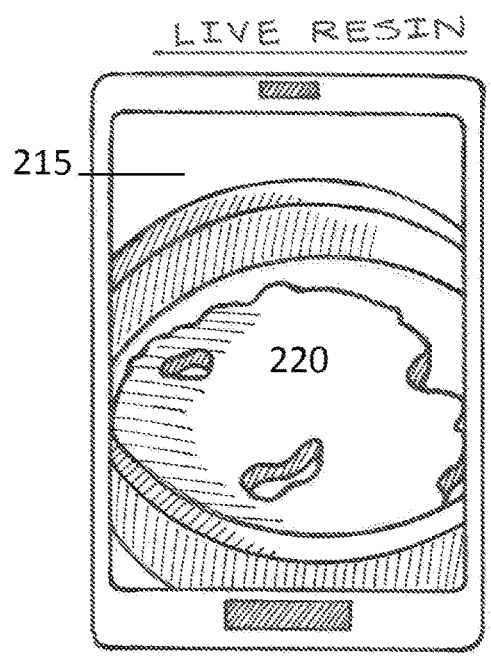

225  Figure 2G
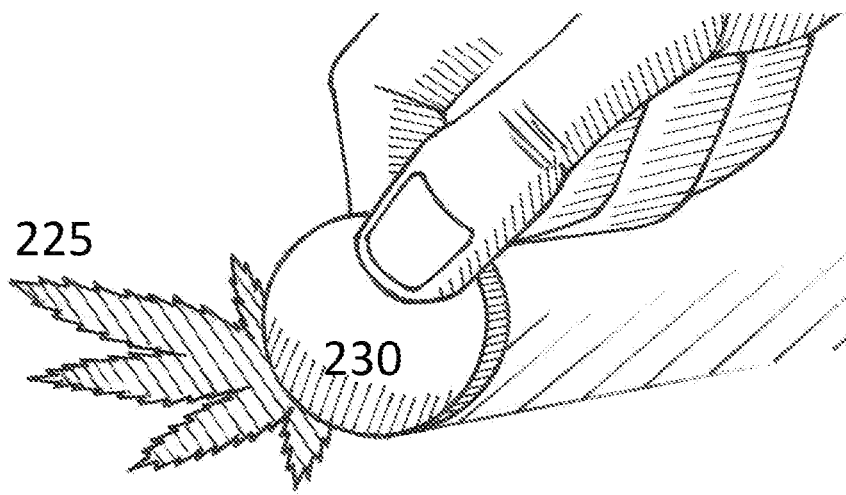
225  230  Figure 2H

300 - Magazine
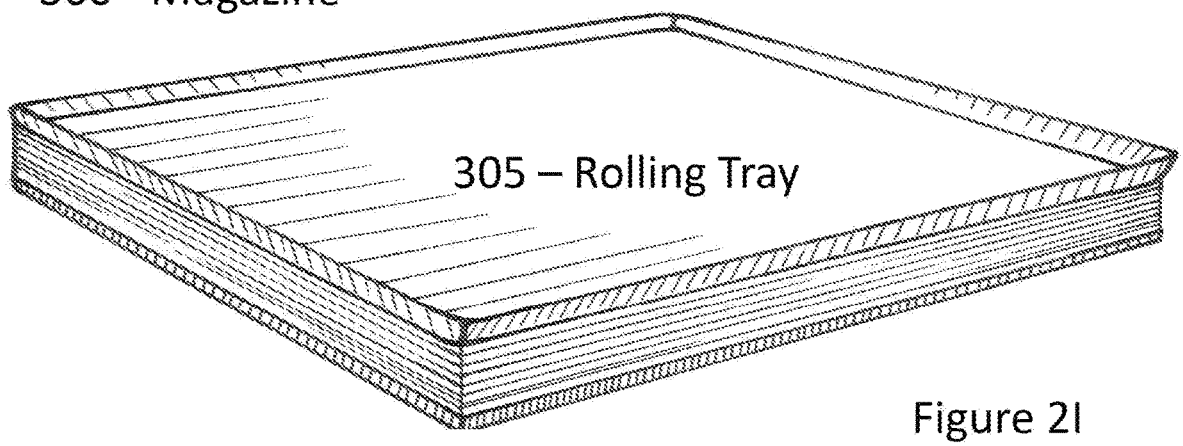
305 – Rolling Tray
Figure 2I
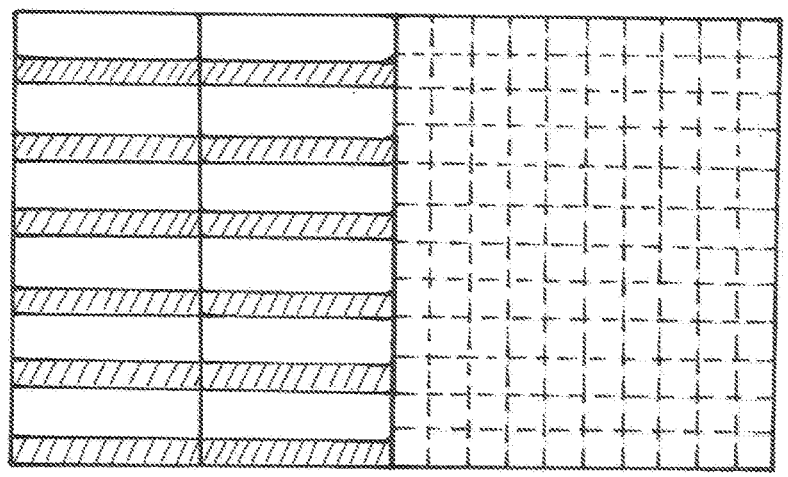
JOINT WRAPS        FILTERS
310         Figure 2J         315

405  QR CODE

PHONE VIEW:

410 - Images

PRODUCT DESCRIPTION INCLUDED

215

METHODS UTILIZING A LIT OCLOCK MULTI-SENSORY CANNABIS MAGAZINE

RELATED APPLICATIONS

This application claims priority to U.S. provisional patent application Ser. No. 63/082,351, filed Sep. 23, 2020, and entitled "Lit o'Clock Multi-Sensory *Cannabis* Magazine," the disclosure of which is hereby incorporated by reference.

BACKGROUND

*Cannabis* sellers do not have a great method of selling their products to individuals who are not physically present in the *cannabis* brick-and-mortar stores. *Cannabis* purchasers are not able to smell the product or examine a visual appearance of the product unless they visit the stores.

BRIEF DESCRIPTION OF THE DRAWINGS

FIG. 2F illustrates images 220 of *cannabis*-related products and/or services in the *cannabis*-related software application according to some embodiments;

FIG. 2G illustrates a *cannabis* related scratch and sniff sticker 225 that is located on one or more pages of the printed article and/or digital magazine;

FIG. 2H illustrates a consumer scratching the scratch and sniff sticker 225 with a hard surface item 230, such as a coin or round metal object, according to some embodiments;

FIG. 2I illustrates a top cover of the *cannabis* magazine or reading article 300 being a rolling tray 305, but a bottom cover of the *cannabis* magazine or reading article 300 may also be a bottom cover;

FIG. 2J illustrates a page of a *cannabis* magazine or reading article including joint wraps or filters according to some embodiments;

DETAILED DESCRIPTION

Figure 1:
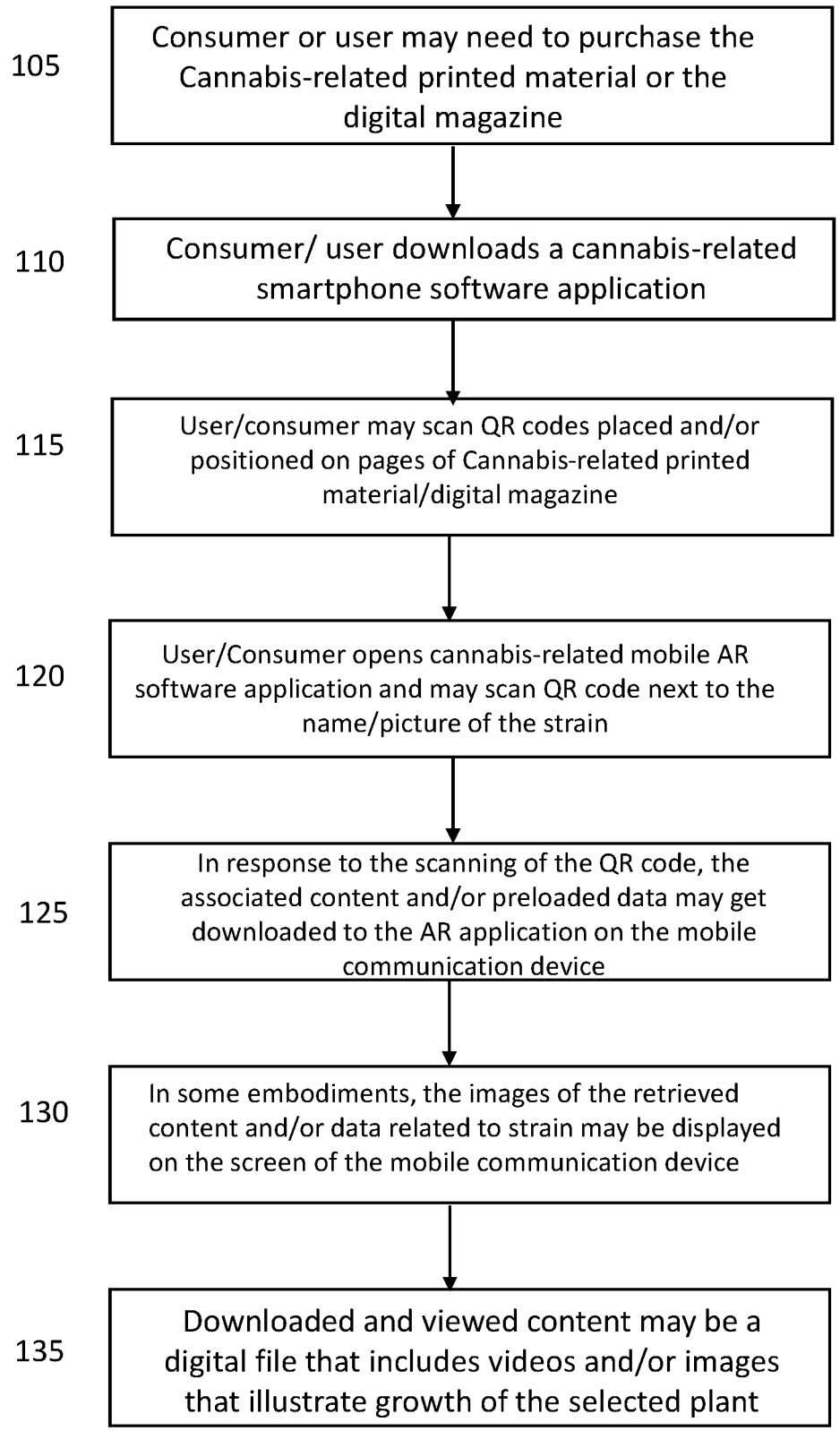
FIG. 1 illustrates a method or process for utilizing the AR-enhanced *cannabis*-related printed material and/or digital magazine file according to some embodiments.
Figure 1:
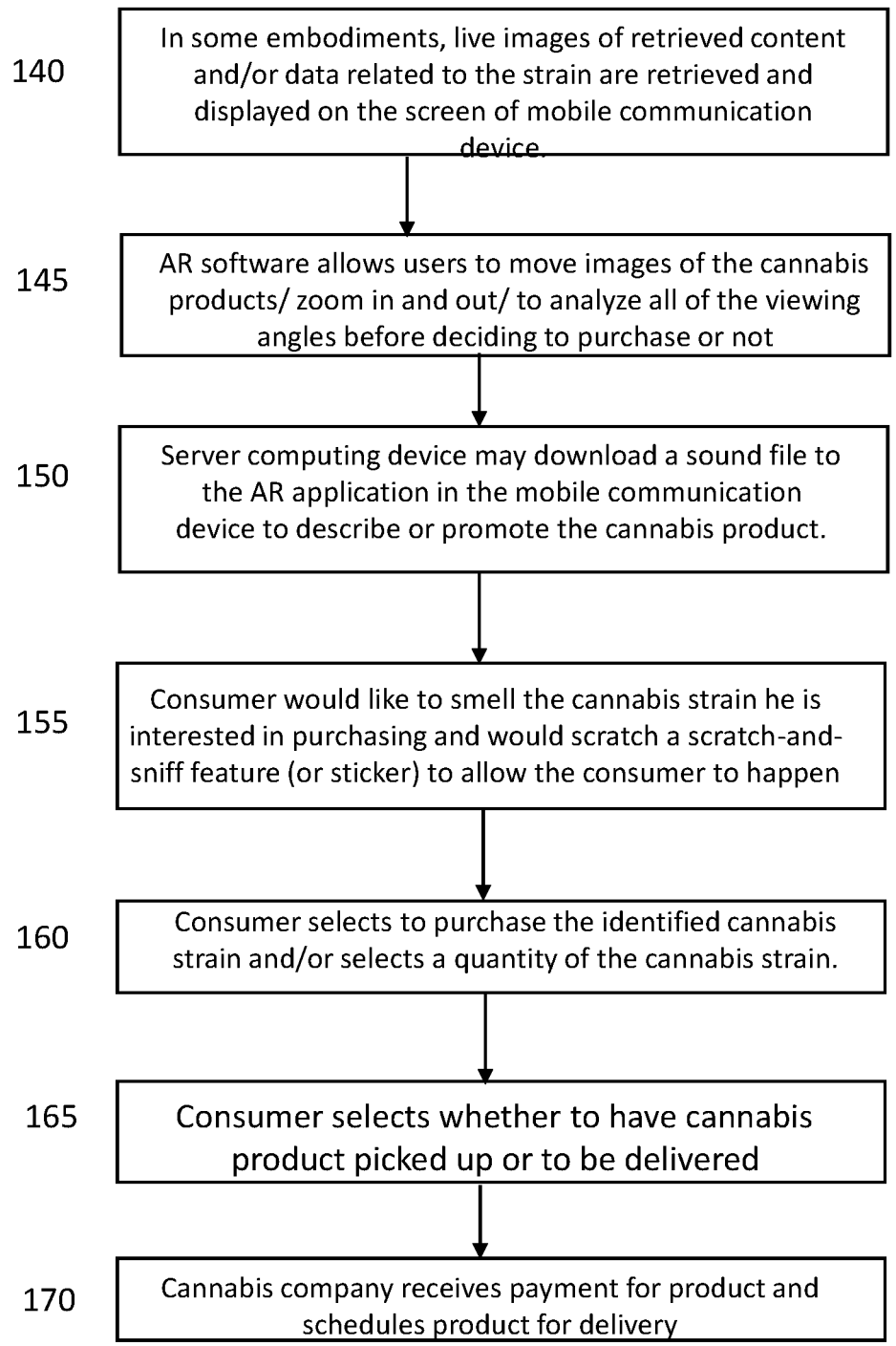

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Described herein is a multi-sensory *cannabis* printed article (e.g., magazine, hardcover book or pamphlet) or digital magazine file that not only allows the user/reader to smell *cannabis* strains through *cannabis*-leaf-shaped scratch-and-sniff stickers, but also allows the user/reader to see visually (via a plurality of or one or more downloaded image and/or video files), hear about (via a plurality of or one or more downloaded sound files) and learn about (via many other downloaded interactive content and/or business content) the *cannabis* strains presented in the printed article and/or digital magazine file using an interlinked mobile communication device (e.g., smartphone) application that includes & corroborates with AUGMENTED REALITY (AR) technology that is incorporated in the downloaded content or data.

In some embodiments, inside the printed article and/or digital magazine file, there will be designated QR Codes, scannable markers and/or tags positioned or located next to any designated Product/Accessory/Item that's available for purchase or simply scannable/viewable. In some embodiments, a reader or user doesn't need to necessarily use the AR-integrated smartphone application to read & enjoy the printed article or digital magazine; the printed article or digital magazine would already include tons of entertaining content & sections to skim/read through that revolves around the *cannabis* industry such as: (a) Shopping/Viewing Section for *Cannabis* (Flowers, Prerolls, Edibles, Concentrates); (b) Shopping/Viewing Section for Exclusive Apparel, Products, Items, Accessories; (c) Collaboration Section with Other Industries & Sectors of Entertainment+ the future *Cannabis* Industry (*Cannabis* Celebrities, V/Bloggers, Influencers); (d) *Cannabis* Business sections (Investments/IPOs, Innovations/Initiatives); (e) Sponsorships & Advertisements; and/or (f) Informational Articles (Benefits of THC/CBD, Scientific studies, Medical Research, *Cannabis* Legality).

In some embodiments, a printed material may be a multi-sensory hard-cover or paper-cover *cannabis*-related magazine. In some embodiments, a digital-rendered version of the *cannabis*-related magazine would also be available with limited features and may include some on the hard-cover or paper-cover *cannabis*-related magazine. In some embodiments, the *cannabis*-related printed material may include a scratch-and-sniff element to allow a user or reader to smell *cannabis*-strains through scratch-and-sniff elements (e.g., stickers) attached to pages of the related printed material. In some embodiments, the *cannabis*-related printed material may include one or more QR codes printed on one or more pages of the *cannabis*-related printed material (or other similar markers printed thereon). In some embodiments, the digital *cannabis*-related magazine file may include one or more OR codes displayable on one or more pages of the magazine file. In some embodiments, users or consumers may have a mobile communication device (e.g., a smartphone) having an augmented-reality (AR) technology software application stored therein. Mobile communication device and/or mobile, computing device may be utilized interchangeably herein and may refer to a mobile phone, a smart phone, a tablet computing device, a wearable computing device or other similar computing devices. In some embodiments, computer-readable instructions may be stored in one or more memory devices of the mobile communication device and may be executable by one or more processors of the mobile communication device in order to initiate and/or operate the *cannabis* AR mobile software application. In some embodiments, an imaging device of the mobile communication device may scan and/or capture the one or more QR codes which may allow a user or consumer to view and/or hear one or more sound files regarding the *cannabis* strains presented in the printed material or the digital magazine file using the interlinked mobile communication device application that includes AR Technology. In some embodiments, the one or more QR codes may be placed next to any product, accessory and/or item that is available to be purchased or that has additional AR-related content associated therewith. Please note that the QR codes are separate and unique and may be linked to different visual content, information content and/or sound content.

In some embodiments, the printed material and/or the digital magazine file may not utilize QR codes and a user and/or consumer may still enjoy content that is integrated within and/or associated with the printed material and/or digital magazine file. In some embodiments, the mobile communication device may not need to be utilized with the *cannabis*-related printed material and/or digital magazine file. In these embodiments, different sections may include: (a) Shopping/Viewing Section for *Cannabis* (Flowers, Prerolls, Edibles, Concentrates, etc.); (b) Shopping/Viewing Section for Exclusive Apparel, Products, Items, Accessories; (c) Collaboration Section with Other Industries & Sectors of Entertainment+the future *Cannabis* Industry (*Cannabis* Celebrities, V/Bloggers, Influencers); (d) *Cannabis* Business sections (Investments/IPOs, Innovations/Initiatives, etc.); (e) Sponsorships & Advertisements; and/or (f) Informational Articles (Benefits of THC/CBD, Scientific studies, Medical Research, *Cannabis* Legality).

*Cannabis* Company (Example) Use Case:

In some embodiments, a (*Cannabis* Company) may be named "Lit o'Clock." The *Cannabis* Company may generate printed material and/or digital magazine file, the contents of which are discussed in detail below. In some embodiments, the "Lit o'Clock" *Cannabis* Company may premiere their multi-sensory *cannabis* printed material and/or digital magazine file to their followers and offer it for sale through their websites and local dispensaries (although other business channels may also be utilized). In some embodiments, there can be a total of 5 magazines produced each year: a) 4 of these (hardcover, paper cover and/or digital) magazines or printed material can come out on a quarterly basis and be focused on entertaining *cannabis* content, as well as the strains that are newly developed/harvested/offered for sale; b) there may be one "Master's Magazine" released annually in April (on 4/20) which may have all strains/products produced for the entire year, as well as more exclusive content, special collaborations, limited 4/20 holiday deals, etc.; and the "Master's Magazine" may have a metal-style cover or other hard cover with the front cover of the magazine also serving as a rolling tray that's caved in for any *cannabis* product(s) that will be used+strains that will be smoked.

As described herein, *Cannabis* Company ("Lit o'Clock") has created a multi-sensory *cannabis* magazine and is now selling the product which comes alongside the unique/exact specifications listed above—for all entertainment & shopping needs. Here is how the step-by-step process would naturally go . . . .

In some embodiments, a consumer may either individually purchase each magazine as they go up for sale one by one on a quarterly basis, or purchase a yearly subscription that includes all 5 of these special magazines. In some embodiments, consumers can purchase the magazines & subscriptions through the *Cannabis* Company's online website and may get it shipped to them or readymade and available for pickup at a local dispensary/store. In some embodiments, once the consumer has received their first magazine, the consumer can open the magazine and browse through all of the magazine's printed and/or digital content. The magazine's general layout may be set up like a traditional collectible's magazine with a Table of Contents in the front including but not limited to: (a) Shopping/Viewing section solely dedicated to every *cannabis* product sold by Cookies, including Flower, Prerolls, Vape Pens, Edibles, Concentrates, Gear, Glass, joint wraps, filters, rolling tray cover page as illustrated in FIGS. 2F, 2I, 2J and 2M below; (b) Shopping/Viewing section on any type of apparel sold by the *Cannabis* Company or any of its Collaborators/Sponsors through the magazine, which is illustrated in FIGS. 2K-2L below; (c) Informational/Viewing section for entertaining content, collaborations with other Companies, Sponsorships, Events, Advertisements, Bloggers, Public Figures & Ambassadors; (d) Business Section solely dedicated to content in connection to the *cannabis* industry that gives insight on latest innovations, start-ups, developments, and even options to look for IPO listings & stocks; and (e) Instructional Section on how to use the magazine's unique Augmented Reality (AR) features—if the consumer is interested in doing so. It's important to remember that the consumer can very easily enjoy all the magazine's content, without needing to use the AR features.

In some embodiments, in the Shopping and Viewing section, the selling of products may include the "Lit o'Clock" dispensary and/or *Cannabis* Company premiering brand new exclusive apparel that's only available through the magazine and not online or in stores. In some embodiments, there will be QR codes next to each item that's available for purchase; upon finding a specific piece of apparel (hoodie, shirt, sweats, hat, etc.), the user can scan the QR code which automatically links you to the AR application integrated with the magazine and lets a user view the specific profile page of that piece of apparel. In some embodiments, a consumer can then view the wearable item on a model to get an exact idea of its true fit/size, zoom in to see the item in full detail, and/or spin the model around if it's a shirt/sweater to see exactly how it would look on a person (yourself) rather than just a picture of the item.

In some embodiments, in the Informational Viewing section, a consumer may be able to find out information on how consuming an upcoming CBD product has benefited the lives of a blogger. (Example: Michael Phelps Olympics); a "Stoner Mom" may write a blog on her love for the new bong that she has added to her collection; and/or a Personal Trainer may explain in an article the benefits of THC in body recovery after a workout.

In some embodiments, a business section of a magazine may include a Stock Futures/Earning Reports for Marijuana companies that are publicly traded such as CRON (Cronos Group Inc). In some embodiments, these reports may allow consumers of the magazine to have some insight on the *Cannabis* Industry as well as provide insight on how to invest smartly, as well as providing more information on the quickly growing industry. In some embodiments, this section may also have information on new greenhouse technology, new inventions/innovations as well as new *cannabis* companies and *cannabis* related companies to please connoisseurs that keep up with the industry and its advancements.

FIG. 1 illustrates a method or process for utilizing the AR-enhanced *cannabis*-related printed material and/or digital magazine file according to some embodiments. In some embodiments, in step 105, a consumer or user may need to purchase the *Cannabis*-related printed material or the digital magazine. In some embodiments, in step 110, a consumer or user may need to download a *cannabis*-related smartphone software application that is associated with the *Cannabis* related printed material or digital magazine file through one of the available third-party software application stores (e.g., Apple App Store; and/or Google Play). The *cannabis*-related smartphone application may be downloaded onto a consumer's mobile communication device. A unique aspect of the *cannabis*-related smartphone or mobile communication device software application may be a creative and functionally improved use of augmented reality to allow users to fully experience all aspects of *cannabis*-related products. A brief description of the utilization of the *cannabis*-related smartphone or mobile communication device software application in conjunction with the *cannabis*-related digital magazine is provided below.

In some embodiments, in step 115, a user or consumer may scan and/or capture QR codes (or other markers) that are placed and/or positioned on different pages of the *Cannabis*-related printed material or the digital magazine. In some embodiments, the QR codes may allow interaction with digital content located on a *cannabis* company's server computing devices and/or related third-party server computing devices, as will be described below. Once the software app has been downloaded to the mobile communication device, consumers can initiate the software application and the consumer or user may be directed or transferred to a camera feature that allows the user or consumer to scan specific QR codes throughout different sections of the magazine, wherever it's an option to virtually see & interact with the digital content or electronic files that is associated with and/or related to the specific QR code. In some embodiments, the digital content or electronic files may be related to *cannabis*-related accessories, *cannabis*-related items, and/or *cannabis*-related products such as *cannabis* strains, *cannabis* flower, gummies, etc.

The *Cannabis*-related printed material or the digital magazine may include one or more QR codes (or other markers) which may be utilized to interact with digital content files. This is unique because most digital magazines or printed materials may have one QR code, but not multiple QR codes that are linked to separate and distinct content. In some embodiments, each QR code throughout the *Cannabis*-related printed material or the digital magazine may be separately scanned. In these embodiments, a user or consumer could use the *cannabis*-related mobile communication device software application's AR features and/or make a purchase and this could lead to multiple interactions with various *cannabis*-related content from a single printed reading article or magazine and/or digital magazine. This has an advantage of increasing consumers purchases because multiple *cannabis* products and/or items may be highlighted at the same time. The process described below shows different QR codes that may be scanned and the interaction between the digital content files linked to and/or associated with the one or more different QR codes. This is a unique aspect of the *Cannabis*-related printed material or the digital magazine.

In simple terms, a user or consumer scans the one or more QR codes using the camera or imaging device of the mobile communication or computing device. In some embodiments, the *Cannabis*-related mobile software device application pulls the necessary preloaded data and/or content for everything from a server computing device or other external computing device, the data and/or content may be downloaded into one or more memory devices of the mobile communication device and in many cases some of the retrieved preloaded data and/or content may be displayed via augmented reality (AR) on a screen or display of the mobile communication device. In some implementations, computer-readable instructions executable by the one or more processors of the mobile communication device may cause the downloading, storing, retrieving and/or displaying of the digital content to occur.

Product Example #1

Figure 2A:
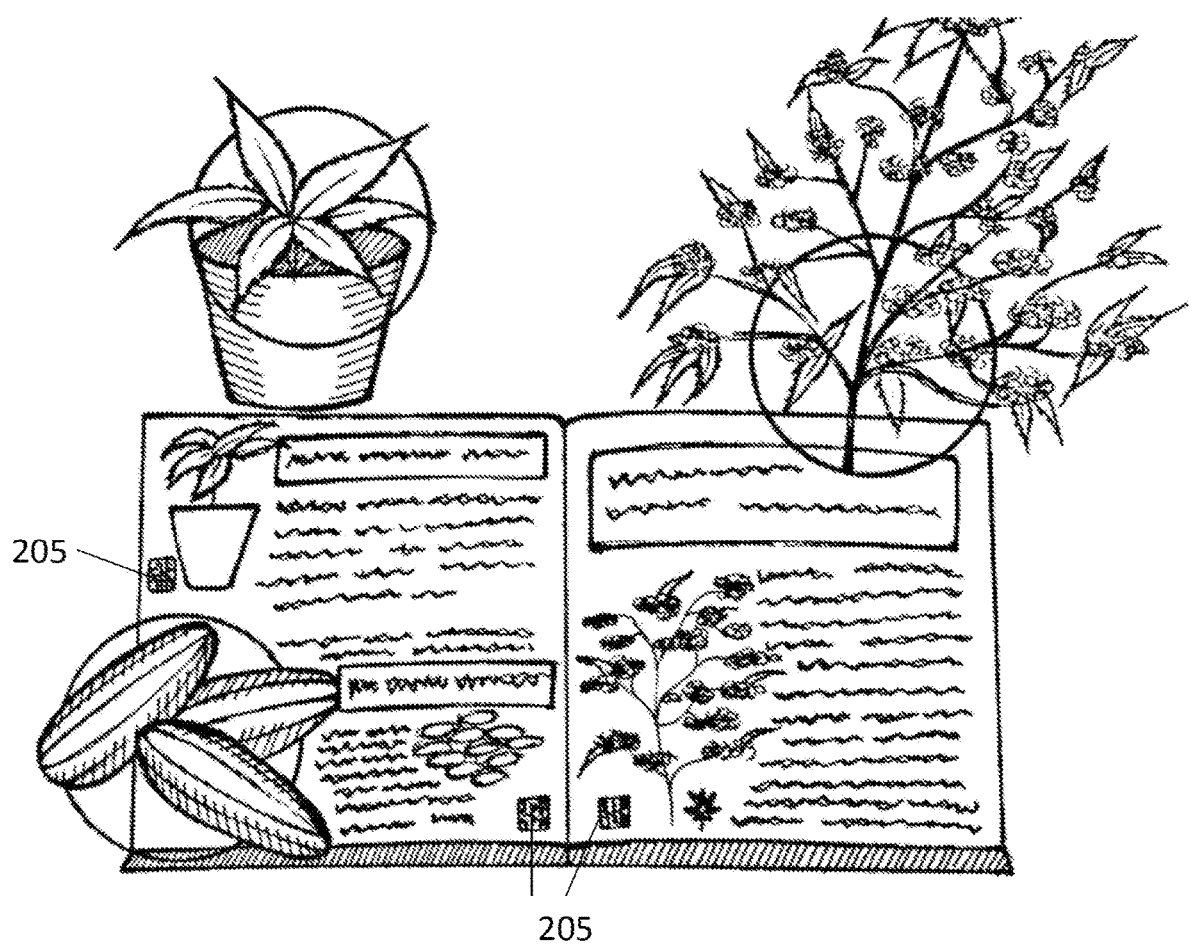
FIG. 2A illustrates pages of a *cannabis*-related printed article and/or digital magazine file according to some embodiments which includes pictures of products and/or QR codes located next to the pictures of products 205.
Figure 2B:
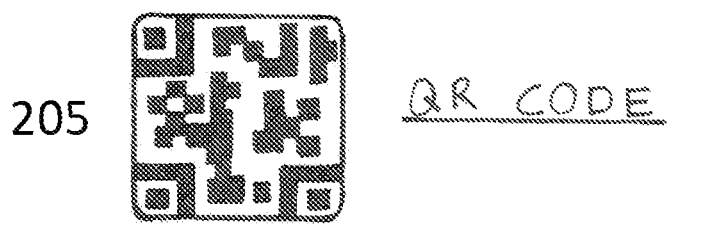
FIG. 2B illustrates a QR code that is next to items in the printed article and/or digital magazine according to some embodiments.
Figure 2C:
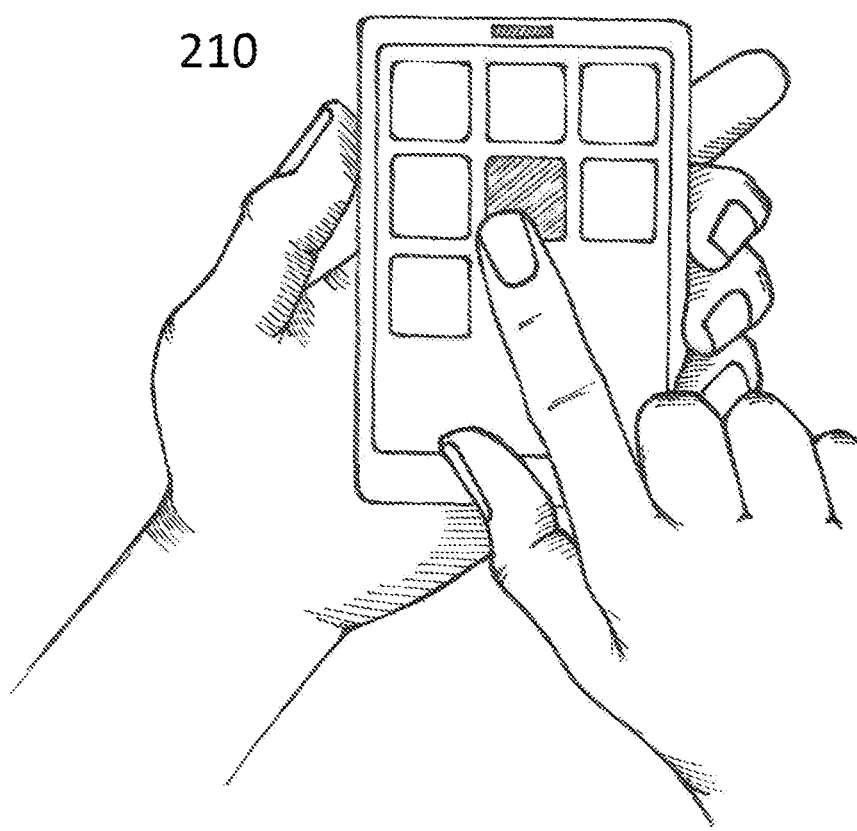
FIG. 2C illustrates a consumer selecting a *cannabis*-related software application according to some embodiments.
Figure 2D:
FIG. 2D illustrates a screen of the mobile communication device asking if an imaging device may be utilized by the *cannabis*-related software application according to some embodiments.
Figure 2E:
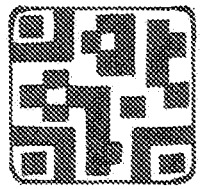
FIG. 2E illustrates a consumer holding a camera directly above a QR code according to some embodiments.
Figure 2E:
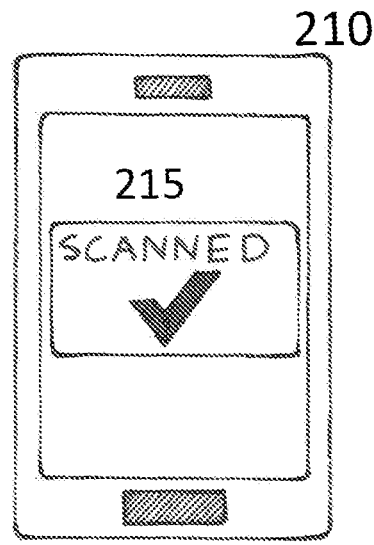
Figure 2K:
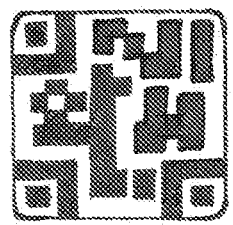
FIG. 2K illustrates a QR Code 405 for *cannabis*-related use accessories, apparel or souvenirs which may be located on pages that include the descriptions or pictures of the use accessories, apparel or souvenirs according to some embodiments.
Figure 2L:
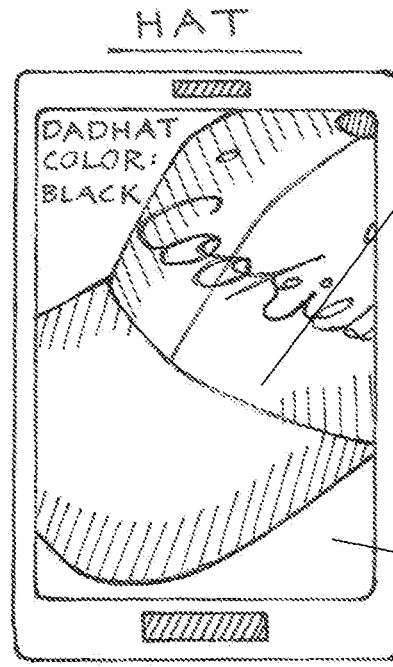
FIG. 2L illustrates an image of an apparel item in a *cannabis* software application according to some embodiments.

FIG. 2A illustrates pages of a *cannabis*-related printed article and/or digital magazine file according to some embodiments which includes pictures of products and/or QR codes 205 located next to the pictures of products 205. FIG. 2B illustrates a QC code that is next to items in the printed article and/or digital magazine according to some embodiments. FIG. 2C illustrates a consumer selecting a *cannabis*-related software application according to some embodiments. FIG. 2D illustrates a screen of the mobile communication device 210 asking if an imaging device may be utilized by the *cannabis*-related software application according to some embodiments. FIG. 2E illustrates results in a *cannabis*-related software application 215 of a user holding a camera directly above a QR code 205 according to some embodiments.

In some embodiments, in step 120, a user or consumer may be looking at the *Cannabis* section on *cannabis* flowers in the *Cannabis*-related printed material and/or digital magazine file, and may notice a brand-new strain premiered through the magazine ("Lit o'Clock"). This is illustrated in FIG. 2A. At this point, the user or consumer may be interested in learning more about the strain "Lit o'Clock", so he may open or initiate his *cannabis*-related mobile AR software application (as illustrated in FIG. 2C) and may scan the QR code next to the name/picture of the strain (the "Lit o'clock" strain) as is illustrated in FIGS. 2B, 2D, and 2E. In some embodiments, in step 125, the QR code associated with the *cannabis* strain includes identifiers and/or links to content and/or preloaded data on the strain on a server computing device. In some embodiments, in response to the scanning of the QR code, the associated content and/or preloaded data may get downloaded to the AR software application 215 loaded on the mobile communication device 210. In some embodiments, the associated content may be stored in one or more memory devices of the mobile communication device. In some embodiments, the associated content may be stored in a server computing device owned by a dispensary and/or a third-party computing device. In some embodiments, the user or consumer may now point a phone's camera at the page of the printed material and/or digital magazine file and images that are downloaded and/or related to the QR code may allow the user or consumer to view and/or inspect the strain further. In some embodiments, a user or consumer doesn't have to be pointing your mobile communication device after scanning the QR code.

In some embodiments, in step 130, the images of the retrieved content and/or data may be displayed on the screen of the mobile communication device no matter where the mobile communication device is pointed. In some implementations, the images of the retrieved content and/or data may be displayed within the *cannabis*-related mobile application 215 or software application. FIG. 2F illustrates images 220 of *cannabis*-related products and/or services in the *cannabis*-related software application according to some embodiments. In other words, after the QR code is downloaded, you don't need to always point your phone at the printed or digital magazine in order to constantly use the AR feature and see the AR content related to the QR code.

In some embodiments, for example, in step 135, the AR content may be a digital file that includes videos and/or images that illustrate growth of the selected plant. In some implementations, the video may include a timeline from when the plant corresponding to the strain from when it was planted to the day the plant has been harvested. Similarly, the content digital files may include a plurality of images highlighting growth of the plant until the plant is harvested. In other words, consumer is able to see the growth of the plant through Augmented Reality (due to the playing of the video file(s) and/or image file(s)) showing a timeline span from day zero to the day the strain has been harvested to the day the strain is ready to be packaged and sent to a *cannabis* clinic. This feature is unique and allows the consumer to be kept up to date and knows exactly when, where, and how the strain was grown. In other words, most AR content is static (e.g., an image file and not a video file) and does not correspond to the actual product being purchased (instead it is general picture of a *cannabis* strain). Therefore, in this embodiment, the content retrieved from the server computing device and downloaded to the mobile communication device may be specific to the actual product that is being displayed and/or sold in the dispensary or dispensaries. This is a unique and exclusive feature that allows consumers to see the natural life cycle of *cannabis* for the flower (bud) products the consumer has selected.

In some embodiments, in step 140, part of the AR content downloaded to the mobile communication device after scanning the QR code, may be a live video and/or image of the actual strain that is waiting and/or located in the clinic to be purchased and/or later consumed or smoked. This is a unique feature in that there is an interactive aspect where a consumer can actually see live video of a *cannabis* product they will be purchasing utilizing the *cannabis* mobile software application on their mobile communication device. In some embodiments, a content server computing device may be receiving live stream video from the *cannabis* dispensary and this may be streamed to the user's computing device (after scanning of the QR code or marker). In other words, not only is the consumer able to see the growth of the plant, but he or she is now able to see the actual strain that's sitting inside the Lit o'Clock *cannabis* clinic (or other *cannabis* dispensary) ready to be purchased & consumed. No other augmented reality systems includes such a feature, where a consumer can scan a QR code (or other scannable code) that is linked to a printed article or digital magazine file and view the actual product the consumer may purchase.

In some embodiments, a digital image of a natural nug of the "Lit o'Clock" strain pops may be displayed on the mobile communication device (e.g., smartphone screen) utilizing augmented reality. In some embodiments, in step 145, the AR software of the *cannabis* mobile software application may display the images of the *cannabis* product with many different characteristics or features (e.g., zoom in and out in and/or change viewing angles in order to analyze all of the viewing angles before deciding to purchase the strain or not purchase the strain). This is an amazing feature that is not included on other *cannabis*-related software applications, because consumers are usually forced to look at simple images on delivery service applications and decide based on that simple image. In contrast, the consumer knows exactly what the *cannabis* strain is going to look like before purchasing and thus has the ability to purchase exactly what product they view, and not just be tricked by a generic picture of an amazing harvest which does not correspond to the actual product being purchased.

Aside from being able to see the strain in detail, in some embodiments, the consumer can also learn about the strain and in that case, hear, more about the strain which helps the user or consumer to gain extreme knowledge on the strain. In some embodiments, a sound file associated with the QR code may be stored on a content server computing device. In response to the QR code for the associated product being scanned or captured, in step 150, the content server computing device may download a sound file to the AR software application in the mobile communication device. In some embodiments, the digital sound content may be downloaded to one or more memory devices of the mobile communication device. In some embodiments, as the plant is coming to life via viewing the Augmented Reality file in the *cannabis* software application, the creator of the strain or a budtender/rapper/public figure/ambassador affiliated with the *cannabis* strain may give an audio detailed description of the strain. The consumer may hear this description because the *cannabis* software application may play the sound file and the sound file may be heard via the one or more speakers on the mobile communication device. The details discussed in the sound file may include flavor, potency, color, THC/CBD content, side effects, and/or estimated long or short lasting high of the selected strain. In some embodiments, this sound file may be exclusive to flower products that the *cannabis*-related retailer is selling.

In some embodiments, another feature of the printed material and/or digital magazine file, is the inclusion of a scratch and sniff sticker that is located next to an image or name of the *cannabis* strain. FIG. 2G illustrates a *cannabis* related scratch and sniff sticker 225 that is located on one or more pages of the printed article and/or digital magazine. In some embodiments, in step 155, if the consumer would like to smell the *cannabis* strain he or she is interested in purchasing, the printed magazine and/or digital magazine would include one or more scratch-and-sniff features (or stickers) to allow the consumer to smell the selected strain. In some embodiments, the scratch and sniff sticker 225 may be located next to the QR code 205 for the selected strain on the page of the printed material or digital magazine file. In some embodiments, the scratch and sniff sticker may be integrated in and/or be part of the image of the strain that is located in the printed material or digital magazine file. FIG. 2H illustrates a consumer scratching the scratch and sniff sticker 225 with a hard surface item 230, such as a coin or round metal object, according to some embodiments. In some embodiments, a consumer looking to buy the new *cannabis* strain "Lit o'Clock" that Lit o'Clock is offering, all the consumer would have to do is scratch the circle next to a picture of that strain utilizing a hard surface item, and then the consumer may be able to catch a scent/aroma of the strain's exact smell or an odor very close to the strain's actual smell. Again, this is an additional unique feature, which taken alone or in combination with the other features describe above and below, provide the consumer with a unique product that provides the consumer with a large amount of information before ever purchasing the *cannabis* strain.

The consumer has now seen the *cannabis* strain to observe it in detail, heard about it to learn everything there is to know, and has also smelled the strain. The consumer may now be interested in purchasing the strain through the magazine, by using the same *cannabis* software application that utilizes these special Augmented Reality (AR) features.

In some embodiments, when the consumer scans the QR code next to the strain listed in the magazine, the preloaded data corresponding to a profile of the strain may get downloaded to the mobile communication device that is running or executing the *cannabis* software application. In some embodiments, a menu may be on a profile page for the strain of *cannabis*.

In some embodiments, the profile page may be downloaded to the mobile communication device and may include the AR content described above. However, in some embodiments, the profile page may also include a purchase icon or purchase button. In some embodiments, if the purchase button is selected, the mobile communication device may communicate with a content server computing device which will then serve and/or download content (e.g., a new web page) that allows a consumer to select a quantity of *cannabis* to be purchased and/or consumed. For example, in step 160, once the consumer clicks "purchase"-he is taken to a second linked web page that has more information on the exact quantities he or she can purchase (1 g, 3.5 g, 7 g, 14 g, or 28 g) of the selected *cannabis* product. Once the consumer decides on an exact quantity, he or she may click on the selected option, which will then take him to a third linked page and that third linked page may be a cart and/or checkout section.

In some embodiments, the content server computing device may serve and/or download a page and/or content for the cart and/or checkout selection. In some embodiments, in step 165, the web page and/or screen may include options to select such as delivery or local dispensary pick-up. In some embodiments, a user or consumer may select an option depending on what's more convenient for the user or consumer.

In some embodiments, in step 170, a customer may pay for the purchased product via one or more known payment methods. In some embodiments, the dispensary (e.g., Cookies) through its e-commerce system may receive confirmation the payment has been authorized. In some embodiments, once payment & delivery or pick-up option has been selected, the *cannabis* company may fulfill the order by 1) communicating with a delivery computing device and/or software application to schedule delivery of the purchased product to the consumer or 2) to package and/or set aside the purchased product for pickup by the consumer for a later time (in a safe and secure area).

FIG. 2I illustrates a *cannabis* magazine or reading article according to some embodiments. In some embodiments, the *cannabis* magazine or reading article 300 may include a rolling tray 305 as part of the *cannabis* magazine or reading article cover. FIG. 2I also illustrates a top cover of the *cannabis* magazine or reading article 300 being a rolling tray 305 according to some embodiments. In other alternative embodiments, a bottom cover of the *cannabis* magazine or reading article 300 may also be a rolling tray or alone may be a rolling tray. This is another unique feature and provides a consumer with the advantage of utilizing the *cannabis*-related magazine as a rolling tray, as well as device where you can view, smell, hear about and/or order selected *cannabis* products.

FIG. 2J illustrates a page of a *cannabis* magazine or reading article including joint wraps or filters according to some embodiments. In some embodiments, the *cannabis* or reading article 300 may include one or more pages of joint wraps 310. In some embodiments, the *cannabis* or reading article 300 may include one or more pages of filters 315 that may be utilized in the joint wraps 310. This is a further unique feature of the *cannabis* magazine or reading article 300 because the feature allows a consumer one item where he can roll and prepare a purchased *cannabis* strain or product.

Figure 2M:
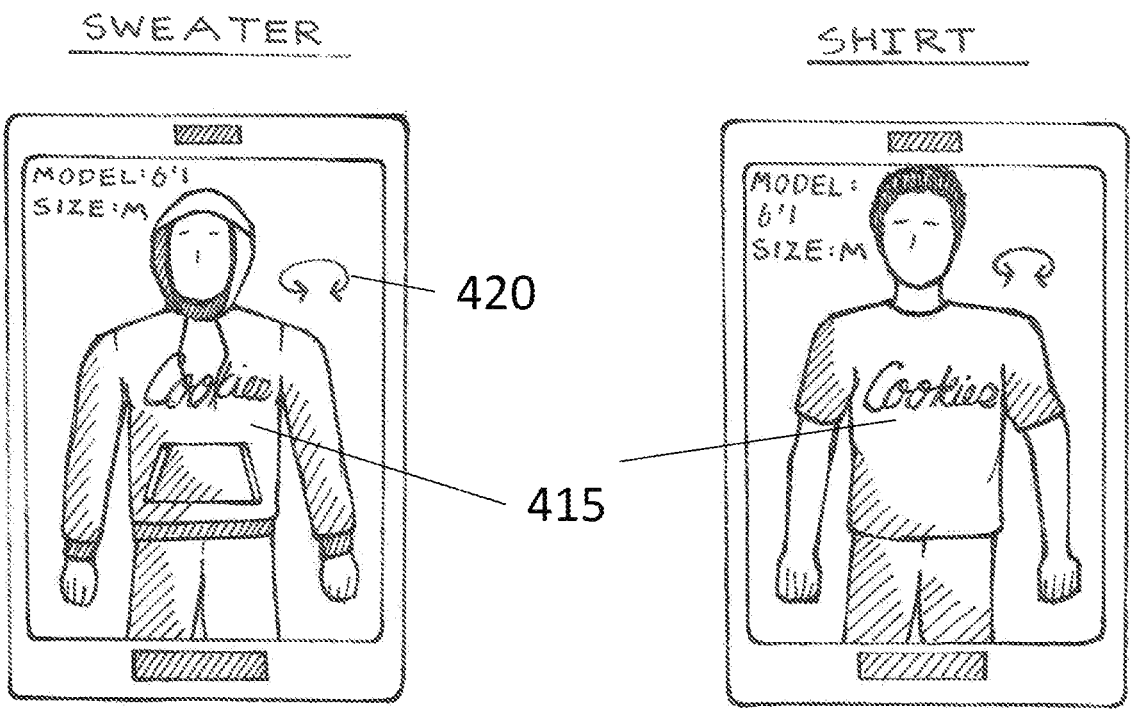
FIG. 2M illustrates two images of apparel items according to some embodiments.

As discussed above, the *cannabis* magazine, reading article or digital magazine file may also include *cannabis*-related use accessories (bongs, pipes, vape pens), apparel, and or souvenirs pages that include descriptions of the use accessories, apparel, or souvenir and/or associated QR codes 405. In some embodiments, the descriptions, pictures or images and/or QR Codes for the use accessories, apparel or souvenir pages may be on different pages of the *cannabis* magazine, reading article or digital magazine file than the *cannabis* products or strains. FIG. 2K illustrates a QR Code 405 for *cannabis*-related use accessories, apparel or souvenirs which may be located on pages that include the descriptions or pictures of the use accessories, apparel or souvenirs according to some embodiments. In some implementations, the consumer may then utilize the *cannabis* software application (including the augmented reality features) and may scan the accessory, apparel and/or souvenir QR code. In response to scanning the accessory, apparel and/or souvenir QR code, a server computing device may provide accessory, apparel and/or souvenir content to the *cannabis* software application on the consumer's mobile communication device in order to allow the consumer to view the use accessory, apparel and/or souvenirs of interest. FIG. 2L illustrates an image of an apparel item in a *cannabis* software application according to some embodiments. In some embodiments, the *cannabis* software application 215 may receive a content file for the apparel item and may display the content file (e.g., an image of the hat 410) on a screen of the mobile communication device. FIG. 2M illustrates two images of apparel items according to some embodiments. In FIG. 2M, the *cannabis* software application 215 may display an image of the apparel item (e.g., shirt or hoodie) 415. In some embodiments, if the user selects spin or zoom icon or button 420, the *cannabis* software application 215 may cause the display of the use accessory, apparel or souvenir item to zoom and/or spin. FIG. 2M illustrates model height and item size included for fit comparison.

Figure 3:
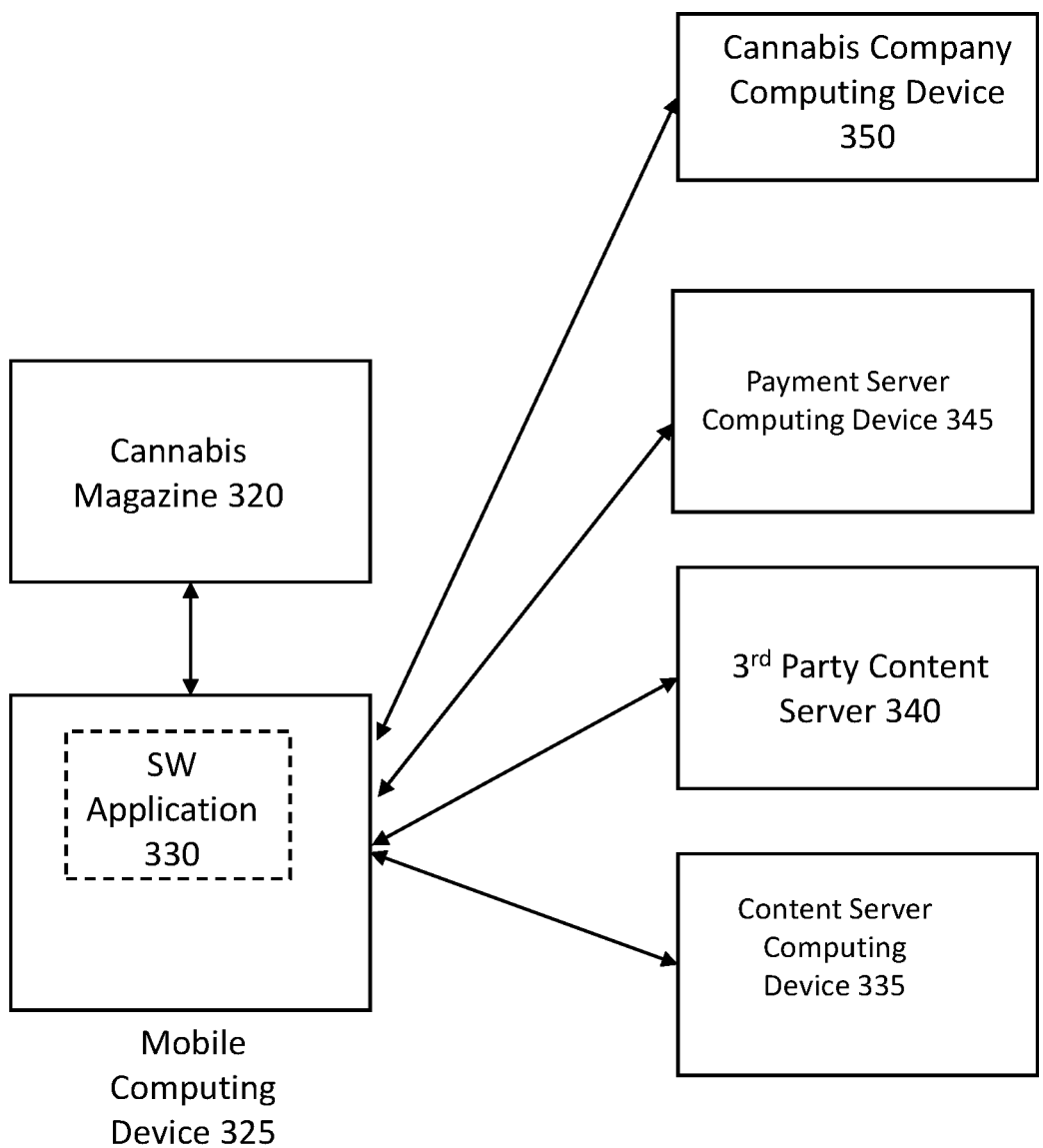
FIG. 3 illustrates a dataflow of parameters or information in the *cannabis* system according to some embodiments.

FIG. 3 illustrates a dataflow of parameters or information in the *cannabis* system according to some embodiments. In some embodiments, the *cannabis* system may include the *cannabis* magazine or reading article 320, the mobile communication device 325, the *cannabis*-related software application 330, a *cannabis* company content server 335, a third-party content server 340, a payment computing device 345, and/or a *cannabis* company computing device 350. In some embodiments, as discussed above, a consumer may purchase a *cannabis* magazine or reading article 320 and may also download the *cannabis* software application 330 into one or more memory devices of the mobile communication device 325. In some embodiments, the consumer may initiate the *cannabis* software application 330 and may begin to investigate and/or evaluate *cannabis* products. In some embodiments, the mobile communication device 325 camera may scan one or more QR codes for *cannabis* products, use accessories, apparel and/or souvenirs and may communicate with the content server 335 to retrieve information corresponding to the scanned QR codes (as described above). In some embodiments, the content may be located on third-party content servers 340 and/or the mobile communication device 325 may communicate with the third-party content servers to retrieve and/or display the associated information, images, files and/or parameters. In some embodiments, if a consumer decides to purchase a *cannabis* product, use accessory, apparel and/or souvenir, then the *cannabis* software application 330 on the mobile communication device 325 may communicate with a payment server or computing device 345 to obtain authorization of the purchase. In some embodiments, then the *cannabis* software application on the mobile communication device 325 may communicate with the *cannabis* computing device 350 to provide delivery and/or pickup for the selected *cannabis* product, use accessory, apparel and/or souvenir.

Product Example #2

Consumer is looking at the *Cannabis* section on Prerolls and notices a brand new 1 gram "Lemon Pepper" pre-rolled joint. At this point, the consumer may be interested in learning more about the "Lemon Pepper" preroll, so he/she opens the AR application on the mobile communication device and scans the QR code next to the picture of the packaged pre-roll inside the printed article or digital magazine file. In this embodiments, for example, the whole point here is to show off the packaging in the printed article or digital magazine file, so the consumer is incentivized to use the AR software application, which will allow him to see the actual pre-rolled joint inside the packaged item.

In some embodiments, the preloaded data and/or content on the preroll gets downloaded by the AR application from the server computing device. In some embodiments, the consumer can now point his/her phone's camera at the printed article or digital magazine file that's lying face down or displayed face, and has the option to inspect the preroll further with a few options in particular. In some embodiments, you can see the "Lemon Pepper" preroll on the mobile communication device screen which gives the user or consumer the most realistic idea of the size of the joint, as well as the color of the *cannabis* wrapped inside the joint paper. In some embodiments, the consumer may move the display of the joint in the joint paper around and play with it by zooming in and analyzing all of its angles before deciding to purchase or not. This is a new and novel feature, because consumers are usually forced to look at simple pictures or images on delivery service applications and decide in that sense. However, in this case, the downloaded content and/or images are the actual product, so the consumer knows exactly what the preroll is going to look like and how big the preroll is before purchasing the product.

In some embodiments, aside from being able to see the preroll in detail, the consumer can also hear more about the selected *cannabis* product, which helps to gain extreme knowledge on the preroll. In some embodiments, in response to the QR code for the selected product being scanned, a content server computing device may download a sound file associated with the preroll. A Lit o'Clock budtender or ambassador gives an audible detailed description of the "Lemon Pepper" pre-rolled joint. These details include how the joint tastes, smokes/burn-time, smells, THC/CBD content, side effects, long or short lasting high, etc. Lastly, this does not include Augmented Reality, and can be accessed by anyone without the application—if the consumer would like to smell the pre-rolled joint he or she is interested in purchasing, there would be a scratch-and-sniff feature which allows the user or consumer to smell an odor that is the same or very close to the smell of the pre=rolled joint.

In our example case with a random consumer looking to buy the new "Lemon Pepper" pre-rolled joint that the Lit o'Clock dispensary is offering, all the consumer would have to do is scratch the circle next to the image of the pre-rolled joint, and then the consumer will be able to catch a scent/aroma of its exact smell or very close to its smell.

The consumer has now seen the pre-roll and observed it in detail, heard about it to learn everything there is to know, and has also smelled the pre-rolled joint. The consumer is now interested in purchasing the "Lemon Pepper" pre-rolled joint through the magazine, by using the same application that utilizes these special Augmented Reality features When the consumer scans the QR code next to the pre-roll listed in the magazine, the preloaded data gets projected onto the application and it instantly takes you to a type of "profile page" for the pre-roll. On this pre-rolls' profile page, you have your unique options to utilize AR, and there is also a "purchase" button somewhere on that same page. Once the consumer clicks "purchase"—he is taken to a second linked page that has more information on the exact size pre-roll he can purchase (e.g., 0.5 g, 1 g, 1.5 g, 2 g, 3.5 g or 7 g packaged bundle). In some embodiments, once the consumer decides on the exact quantity, they click on the option given, which will then take them to a third linked page that is the cart and/or checkout section. In some embodiments, in the cart/checkout section, there is an option for delivery or local dispensary pick-up depending on what's more convenient for the consumer. In some embodiments, once payment & delivery or pick-up option has been processed and chosen, the Lit o'Clock dispensary will be informed through their system that's integrated with the application. In some embodiments, the Lit o'Clock dispensary system may fulfill the order and either send out a driver if it's a delivery option or put the selected preroll aside in a designated & secure area if it's a pick-up option, as is done with food delivery services.

Product Example #3

In some embodiments, a Consumer is looking at the *Cannabis* section on Gear/Glass products and notices a brand-new area dedicated to different "Lit o'Clock" Glass Bongs or use accessories. In some embodiments, one particular glass bong by the name of "Fidelio" catches the consumer's eye, and he or she wants to learn more about the bond and how exactly the bong works. In some embodiments, the consumer is interested in learning more about the "Fidelio" bong, so he/she opens the *cannabis*-related AR software application and scans the QR code next to the picture of "Fidelio" inside the printed article or digital magazine file. In some embodiments, the AR software application may allow the consumer to see the actual size (e.g., width, height} of the "Fidelio" when the preloaded data on the glass bong gets downloaded by the AR software application to the mobile communication device from the server computing device.

In some embodiments, the consumer can now point his/her phone's camera at the printed article or digital magazine file that's lying face down and has the option to inspect the product further with a few options in particular. In some embodiments, a consumer can see the "Fidelio"

glass bong on the mobile communication device (e.g., phone) screen which gives a consumer the exact size of "Fidelio" and the consumer can move the image of the bong around and adjust or manipulate the image by zooming in and analyzing all of its angles before deciding to purchase or not. In addition, 2ith the Augmented Reality features, the consumer may also be able to see how "Fidelio" would look on the coffee table or on a shelf. In other words, a consumer can select the *cannabis*-related product as well as a virtual embodiment in which product may be positioned and/or placed. In some embodiments, the server computing device may download the virtual environment to the AR software application in the mobile communication device. Or in an alternative embodiment, the AR software application may present the image of the selected *cannabis* product in the environment in which the product may be utilized. This is an amazing feature, because consumers are usually forced to look at simple pictures on delivery service applications or other catalogs and decide in that sense; in this case, the consumer knows exactly what the size and full shape of the product is.

In some embodiments, aside from being able to see the bong in detail, the consumer can also hear more about it which helps to gain extreme or additional knowledge on the gong. In some embodiments, the server computing device may download a sound file to the AR software application on the mobile communication device which describes the bong in detail. In some embodiments, a Lit o'Clock budtender or ambassador gives a detailed description of the bong. These details include the features of the bong, the capacity, the smoke, and/or long or short lasting high. The consumer has now seen "Fidelio" and observed it in detail and heard about it to learn everything there is to know. The consumer is now interested in purchasing the "Fidelio" bong through the magazine, by using the same software application that utilizes these special Augmented Reality features. In some embodiments, when the consumer scans the QR code next to the bong listed in the printed article or digital magazine file, the preloaded data gets projected onto the application and the user or consumer is connected to a type of "profile page" for the bong. On this bong's profile page, you have your unique options to utilize AR, and there is also a "purchase" button somewhere on that same web page In some embodiments, once the consumer clicks "purchase"—he/she is taken to a second linked page that has more information on the exact quantity of the product (ex. 1, 2, 3). In some embodiments, once the consumer decides on the exact quantity, the consumer may click on the selected option, which will then take them to a third linked page that's basically the cart and/or checkout section. In some embodiments, in the cart/checkout section, there is an option for delivery or local dispensary pickup depending on what's more convenient for the consumer. In some embodiments, once payment & delivery or pick-up option has been processed and chosen, the Lit o'Clock dispensary server computing device will be informed. In some embodiments, the Lit o'Clock system may fulfill the order and either send out a driver if it's a delivery option or put the selected bong aside in a designated & secure area if it's a pick-up option.

Product Example #4

In some embodiments, a consumer may be looking at the *Cannabis* section on Cultivation/Growing products and notices a brand-new clone/seed to a new *cannabis* strain "Lit o'Clock Clone". In some embodiments, this plant catches the consumer's eye, and he or she wants to learn more about it and how exactly the consumer would be able to cultivate the plant himself.

In some embodiments, at this point, the consumer may be interested in learning more about the "Lit o'Clock Clone", so he/she opens the AR software application on a mobile communication device and scans the QR code next to the picture of "Lit o'Clock Clone" inside the printed article and/or digital magazine file. In some embodiments, the whole point here is to show off the packaging in the magazine, so the consumer is incentivized to use the AR software application, which will allow him to see the actual size (width, height} of the plant "Lit o'Clock Clone" and be able to predict growth.

In some embodiments, the preloaded data from the server computing device on the clone may get downloaded by the AR application to the mobile communication device. In some embodiments, the consumer can now point his/her phone's camera at the printed article or digital magazine file that's lying face down or can take the mobile communication device (e.g., phone) somewhere else and (for example) point in one's garden, grow house or patio, and has the option to inspect the product further with a few options in particular.

In some embodiments, you can see the "Lit o'Clock" clone on the mobile communication device (e.g., phone) screen which gives you the approximate size of the clone; the consumer can move it around and play with it to find the perfect area in which the plant would grow. With the Augmented Reality features, the consumer will also be able to see how "Lit o'Clock" clone would look growing in a garden box, grow house or patio. This is an amazing feature, as it gives consumers a way to approximate what the plant would like while growing, as well as provide an approximate mature plant size.

Aside from being able to see the plant in detail, the consumer can also hear more about it which helps to gain extreme or additional knowledge on the strain. A Lit o'Clock budtender or ambassador gives a detailed description of the plant. These details include how to care for the plant, estimated growth period, and growth period. The consumer has now seen "Lit o'Clock" clone and observed it in detail and heard about it to learn everything there is to know. The consumer is now interested in purchasing the clone through the printed article or digital magazine file, by using the same software application that utilizes these special Augmented Reality features. When the consumer scans the QR code next to the clone listed in the printed article or digital magazine file, the preloaded data gets projected onto a mobile communication device screen by the AR software application and the AR software application instantly takes you to a type of "profile page" for the clone/strain. On this strains profile page, you have your unique options to utilize AR, and there is also a "purchase" button somewhere on that same page Once the consumer clicks "purchase"—he is taken to a second linked page that has more information on the exact quantity of the product. (ex. 1, 2, 3 . . . ). Once the consumer decides on the exact quantity, the consumer may click on the option given, which will then take them to a third linked page that's basically the cart and/or checkout section. In the cart and/or checkout section, there is an option for delivery or local dispensary pick-up depending on what's more convenient for the consumer. Once payment & delivery or pick-up option has been processed and chosen, "Lit o'Clock" dispensary will be informed through their system that's integrated with the software application. "Lit o'Clock" dispensary fulfills the order and either sends out a driver if it's a delivery option or puts it aside in a designated & secure area if it's a pick-up option. much like Postmates orders for restaurants.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

The invention claimed is:

1. A method of selecting, purchasing and receiving a *cannabis* product by a consumer, comprising:
   purchase a *cannabis*-related magazine, the *cannabis*-related magazine including two or more pages, the two or more pages each including a QR code related to a *cannabis* strain, and wherein the *cannabis*-related magazine further includes an additional page that includes one or more *cannabis* joint wraps;
   wherein the *cannabis*-related magazine has a top cover and a bottom cover, and wherein one of the top cover or the bottom cover is a rolling tray that is caved in to utilize with the *cannabis* strain;
   download a *cannabis*-related software application on a mobile communication device;
   initiate operation, at the mobile communication device, of the *cannabis*-related software application;
   scan a first QR code on one of the two or more pages of the *cannabis*-related magazine, utilizing a camera of the mobile communication device, the first QR code being related to a first *cannabis* strain that the consumer has identified;

downloading digital content files associated with the first *cannabis* strain to the mobile communication device, the digital content files including augmented content about the first *cannabis* strain; and displaying the digital content files associated with the first *cannabis* strain including the augmented content on a monitor or screen of the mobile communication device.

2. The method of claim 1, wherein the digital content files include a plurality of image files to show a growth cycle of the first *cannabis* strain.

3. The method of claim 2, wherein the consumer may select different zoom and/or viewing angles of the first *cannabis* strain in the *cannabis* software application to further inspect quality of the first *cannabis* strain.

4. The method of claim 1, wherein the digital content files include one or more video files to show a growth cycle of the first *cannabis* strain.

5. The method of claim 1, further comprising:
receiving a live video stream of a live picture of the first *cannabis* strain in a *cannabis* dispensary from a server computing device in response to the scanning of the first QR code; and
displaying the live video stream in the *cannabis* software application on the mobile communication device to allow the consumer to see or view an actual image of the first *cannabis* strain the consumer is purchasing.

6. The method of claim 1, further comprising:
receiving an audio file related to the first *cannabis* strain at the mobile communication device in response to the scanning of the first QR code; and
playing the received audio file on a speaker of the mobile communication device, the received audio file to further describe characteristics of the first *cannabis* strain.

7. The method of claim 1, wherein one of the two or more pages of the *cannabis*-related magazine have scratch and sniff stickers or articles printed thereon or embedded therein, and wherein in response to the scratch and sniff stickers or articles being scratched, a smell or scent is emitted from the scratch and sniff stickers or articles, the smell or scent corresponding to the first *cannabis* strain.

8. The method of claim 1, further comprising:
receiving a profile page including a menu from a server computing device, the menu including a listing of the first *cannabis* strain and an associated purchase icon or button; and
displaying the profile page including the listing of the first *cannabis* strain on the monitor or screen of the mobile communication device.

9. The method of claim 8, further comprising:
receiving a selection event from the consumer identifying the first *cannabis* strain is to be purchased;

downloading a selection page or menu, the selection page or menu including different quantities and packaging for the first *cannabis* strain in response to receiving the selection event; and
displaying the selection page or menu identifying the different quantities and packaging for the first *cannabis* strain on the monitor or screen of the mobile communication device.

10. The method of claim 9, further comprising:
receiving a quantity and packaging selection parameter for the first *cannabis* strain;
downloading a checkout or cart page or menu; and
displaying the checkout or cart page or menu on the monitor or screen of the mobile communication device.

11. The method of claim 10, further comprising:
receiving a delivery or pickup indicator for the first *cannabis* strain from the consumer;
displaying a preferred method of receiving the first *cannabis* strain on the monitor or screen of the mobile communication device;
communicating with a third-party computing device to arrange delivery of the first *cannabis* strain if the indicator is a delivery indicator; and
communicating with a dispensary computing device to arrange pickup of the first *cannabis* strain if the indicator is a pickup indicator.

12. The method of claim 11, further comprising:
receiving payment parameters from the consumer;
communicating the payment parameters to a payment computing device to authorize the payment parameters for the consumer; and
receiving payment confirmation parameters from the payment computing device; and
arranging the pickup or delivery of the first *cannabis* strain in response to determining that the payment confirmation parameters indicate authorization.

13. The method of claim 1, wherein the *cannabis*-related magazine further includes a second additional page including one or more *cannabis* joint filters.

14. The method of claim 1, further comprising:
scan a second QR code on one of the two or more pages of the *cannabis*-related magazine, utilizing the camera of the mobile computing device, the second QR code related to a use accessory, an apparel item or a souvenir that has identified,
downloading second digital content files associated with the use accessory, the apparel item or the souvenir to the mobile communication device, the second digital content files including second augmented content; and
displaying the second digital content files including the second augmented content associated with the use accessory, the apparel item or the souvenir on the monitor or screen of the mobile communication device.

* * * * *